May 29, 1928.  
W. GLUCKIN ET AL  
1,671,577  
APPARATUS FOR MANUFACTURING DOLL AND MANIKIN HEADS  
Filed April 8, 1926
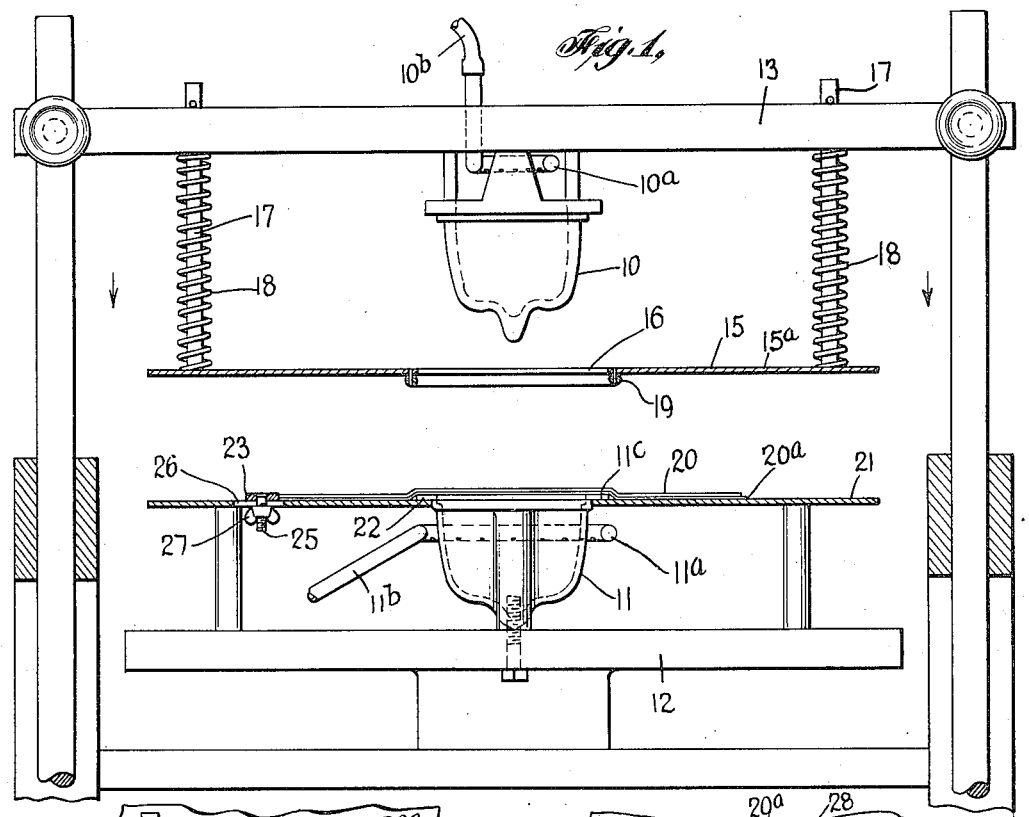
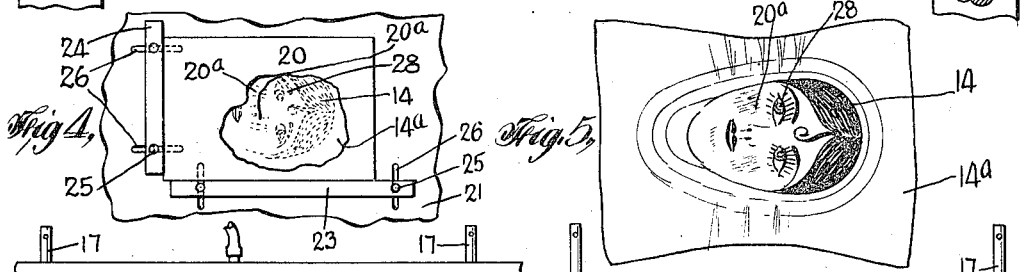
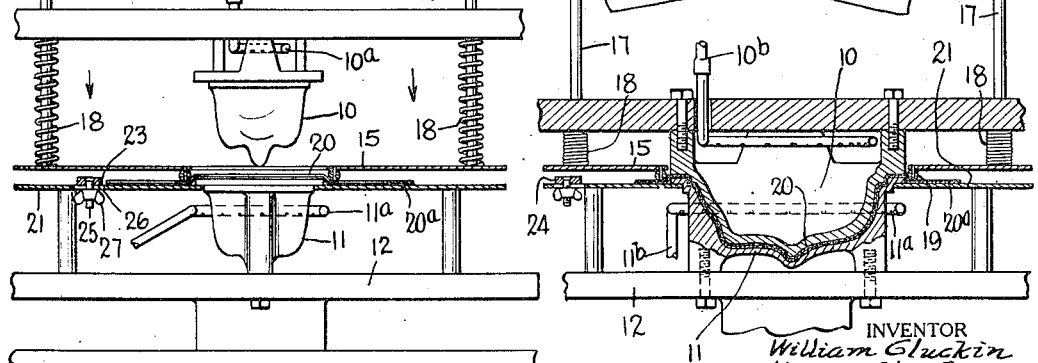

Patented May 29, 1928.

1,671,577

UNITED STATES PATENT OFFICE.

WILLIAM GLUCKIN AND HARRY GLUCKIN, OF BROOKLYN, NEW YORK, ASSIGNORS TO WM. GLUCKIN & CO., INC., OF NEW YORK, N. Y., A CORPORATION OF NEW YORK.

APPARATUS FOR MANUFACTURING DOLL AND MANIKIN HEADS.

Application filed April 8, 1926. Serial No. 100,765.

This invention relates to apparatus designed particularly for use in the manufacture of heads or the facial portion of heads for use in the manufacture of dolls, manikins and other purposes; and the object of the invention is to provide an apparatus consisting of two die members, one of which is supported upon the bed or stationary table of the apparatus, and the other of which is mounted upon a frame movable toward and from the table of the apparatus and into and out of engagement with the first named die and with a spring controlled tension frame suspended between said dies and movable with and independently of the supporting member of the movable die whereby a workpiece may be held in a stretched position under tension prior to the engagement of one die with the other in the formation of a head or facial body; a further object being to provide means for increasing the pressure of the springs whereby the increased tension is applied to the workpiece as the dies are brought into engagement with each other and further in the provision of means whereby the workpiece may frictionally pass between said tension device and a supporting table to allow for the feed of the workpiece into and between the separate dies under tension; a still further object being to provide the machine with means for gaging the proper placement of a workpiece or workpieces in the machine whereby predetermined markings or characteristics on one of the workpieces may be brought into proper position with reference to predetermined parts of the die; and with these and other objects in view, the invention consists in an apparatus of the class and for the purpose specified which is simple in construction, efficient in use and which is constructed as hereinafter described and claimed.

The invention is fully disclosed in the following specification, of which the accompanying drawing forms a part, in which the separate parts of our improvement are designated by suitable reference characters in each of the views, and in which:—

Fig. 1 is a diagrammatic view of an apparatus showing two die members mounted therein in spaced relation.

Fig. 2 is a view similar to Fig. 1 on a reduced scale and showing the parts in a different position.

Fig. 3 is a view similar to Fig. 2 but showing the die members brought together and indicating a workpiece formed thereby.

Fig. 4 is a plan view of a part of a table member which we employ and indicating a workpiece mounted thereon; and, Fig. 5 is a detail view of a workpiece formed by our improved apparatus.

In the drawing, we have indicated at 10 and 11 the separate die members which we employ in the production of a predetermined head or facial body for use in the manufacture of dolls, manikins and the like, the die member 10 constituting the male member and the member 11, the female, the latter being mounted on the bed plate or table proper 12 of a press of any kind or class, preferably such presses as are used in the formation of hats or the crowns and brim portions of hats, while the die member 10 is supported in connection with a plunger 13 movable toward and from the body 12 by any suitable means, such for example as a foot treadle or lever. It will be understood that the die members 10 and 11 are of a specific contour and designed to produce a facial body or head having different contour as for example in the production of the head or facial body 14 shown in Fig. 5 of the drawing from a suitable workpiece later described. The dies 10 and 11 are preferably of the heated type and at 10$^a$ and 11$^a$ are shown burners or heating devices of any kind or class, in the construction shown, gas burners being indicated. At 10$^b$ and 11$^b$, we have indicated pipes or tubes adapted to be coupled with a gas supply pipe in the usual or any desired manner.

Supported in connection with and movable relatively to the plunger 13 is a tension and workpiece stretching device 15 in the form of a plate 15$^a$ having a central aperture 16 through which the die member 10 is adapted to pass, and rods 17 mounted in connection with the plate 15$^a$ and passing through the plunger 13, coil springs 18 being monuted on said rods between the plunger 13 and said plate. The lower face of the plate 15$^a$ around the aperture 16 is provided with a ring 19 adapted to engage a workpiece 20 mounted upon a supplemental bed plate or table 21 supported on the main bed plate 12 and in spaced relation thereto, the upper part of the die member 11 seating upon the plate 12 as seen at 22 by a projecting flange 11ᶜ on said die member 11, and the ring 19 is adapted to engage the workpiece 20 around the periphery flange 11ᶜ.

Mounted on the upper face of the table member 21 are two gage strips 23 and 24 adjustable into different positions on the table member by bolts 25 passed through elongated slots 26 in said table member and winged nuts 27 on the bolts for retaining the strips 23 and 24 in adjusted position. The strips 23 and 24 serve to guide the setting of the workpiece 20 or the separate sheets 20ᵃ and 20ᵇ thereof in proper position upon the table 21 to bring the printed, lithographed or other characteristics or markings 28 on the lower workpiece sheet 20ᵃ in proper position between the dies 10 and 11 so that when the dies are brought together into the position shown in Fig. 3 of the drawing, the characteristics or markings of the eyes, eye brows, hair, lips, etc. on the lower face of the sheet 20ᵃ will register in proper position on the finished head or facial body 14 as seen in Fig. 5 of the drawing and to register with the facial contour formed of the workpiece or the separate sheets 20ᵃ and 20ᵇ thereof.

The sheet 20ᵃ is preferably of a close woven fabric of any kind or class while the sheet 20ᵇ is preferably composed of buckram or a sized fabric of any kind or class to give stiffness and rigidity to the completed product 14.

It is also preferred that the sheet of fabric 20ᵃ be of a color to represent the desired facial color while the characteristics or markings applied by lithographing, printing or any other manner, be of different colors to facilitate the production of different colored eyes and hair, it being also understood that different facial contours may be arranged by the use of dies constructed for such purpose. The lithographing or printing may also be widely varied and modified in each form of facial contour produced by predetermined dies.

The operation of our improved apparatus will be readily understood from the foregoing description when taken in connection with the accompanying drawing and the following statement. When the parts of the apparatus are in the position shown in Fig. 1 of the drawing, a lithographed, printed or otherwise characterized sheet 20ᵃ is placed upon a moistened sheet of buckram 20ᵇ, after which said sheets are placed upon the table member 21 with two of the edges of the sheet 20ᵃ arranged adjacent the gage strips 23 and 24, it being understood that said sheet 20ᵃ is cut to bring said edges in predetermined arrangement with reference to the characteristics or markings applied to one face of the sheet, and the markings on said sheet are arranged downwardly. It will also be understood that the dies 10 and 11 will have been brought to a predetermined degree of heat by the burners or other heating devices 10ᵃ and 11ᵃ and the machine is then operated to move the plunger 13, the die 10 on said plunger, together with the tension device 15, downwardly. In this operation, the tension device or the ring 19 thereof is first brought into engagement with the workpiece 20 and serves to stretch said workpiece smoothly and firmly over the upper face of the bottom or stationary die 11, and to place the workpiece so stretched, under tension by the slight compression of the springs 18 on the rod 17 as seen in Fig. 2 of the drawing. On the completion of the downward movement of the plunger 13 and die 10, the tension device being now retained in a fixed position, the workpiece is forced into the die 11 by the die 10. In this operation, the fabric sheets 20ᵃ and 20ᵇ of the workpiece 20 are frictionally drawn beneath the ring 19 and the adjacent face of the table member 21, it being further understood that from the movement of the die 10 in the position shown in Fig. 2 to the position thereof shown in Fig. 3, the tension applied to the workpiece is steadily increased in the operation of the springs 18. The purpose of the tension device is to retain the workpiece firmly stretched and under tension at all times, to prevent any possible wrinkling of the workpiece, especially upon the head or facial body 14, resulting in the production of smooth surfaces on said body, notwithstanding the fact that the marginal ways 14ᵃ of the body may be wrinkled and of irregular formation in the resulting product as seen in Fig. 5. It will also be understood that the heated dies 10 and 11 are preferably retained in the position shown in Fig. 3 of the drawing for such period of time as to dry out the moistened buckram or both sheets of the workpiece whereby when the dies are separated and the workpiece removed, the same will retain the position or contour given it by such dies.

The head of the doll or facial body 14 made by the apparatus herein shown and described and as indicated in Fig. 5 of the drawing is made the subject matter of a companion application, filed April 8, 1926, Serial No. 100,766, and is merely shown in this case to illustrate one of the products formed by our improved apparatus.

It will be understood that our invention is not necessarily limited to any specific shape or form of the dies or die members employed nor to the manner of their mounting and operation, nor are we limited to the use of two or more sheets or workpieces in the construction of the head or facial body, and various other changes in and modifications of the construction herein shown and described may be made within the scope of the appended claims without departing from the spirit of our invention or sacrificing its advantages.

Having fully described our invention, what we claim as new and desire to secure by Letters Patent, is:

1. An apparatus of the class described comprising two die members, means for supporting a workpiece adjacent one of said die members, a tension device positioned between the die members and adapted to be moved into engagement with the workpiece to support the same in predetermined position prior to the engagement of the die members one with the other and with said workpiece, and means for bringing said die members together and to form of the workpiece positioned therebetween, a body of facial contour.

2. An apparatus of the class described comprising two die members, means for supporting a workpiece adjacent one of said die members, a tension device positioned between the die members and adapted to be moved into engagement with the workpiece to support the same in predetermined position prior to the engagement of the die members one with the other and with said workpiece, means for bringing said die members together and to form of the workpiece positioned therebetween, a body of predetermined contour, and means for increasing the spring pressure of said tension device in the operation of moving the dies into operative position to increase the pressure applied to said workpiece in said operation.

3. An apparatus of the class described comprising two die members, means for supporting a workpiece adjacent one of said die members, a tension device positioned between the die members and adapted to be moved into engagement with the workpiece to support the same in predetermined position prior to the engagement of the die members one with the other and with said workpiece, means for bringing said die members together and to form of the workpiece positioned therebetween, a body of predetermined contour, means for increasing the spring pressure of said tension device in the operation of moving the dies into operative position, to increase the pressure applied to said workpiece in said operation and means for gaging the position of the workpiece in the machine whereby predetermined characteristics on the workpiece may be brought into proper position with reference to predetermined contours on the dies.

4. An apparatus for fashioning the heads or facial bodies of dolls, manikins and the like from a lithographed or otherwise characterized workpiece, dies for fashioning the workpiece to the desired form; and means for properly positioning and supporting, independent of said dies, the workpiece in the machine to bring the characteristics thereof in position to register with predetermined parts of said dies prior to bringing said dies together to bring predetermined facial markings in proper position on a head or facial body produced by said dies.

5. An apparatus for fashioning the heads or facial bodies of dolls, manikins and the like from a lithographed or otherwise characterized workpiece, means for properly positioning the workpiece in the machine to bring the characteristics thereof in position to register with predetermined parts of the apparatus to bring predetermined facial markings in proper position on a head or facial body produced by the apparatus, and means cooperating with the workpiece to stretch a predetermined portion thereof and to retain the same in a stretched position under tension.

6. An apparatus of the class described comprising a stationary die supporting member, another die supporting member movable toward and from the first named member, a workpiece supporting table on the stationary die supporting member, and a tension device carried by the movable die supporting member and movable relatively thereto for engagement with the workpiece prior to the engagement of the dies therewith and for placing the same under increased tension in the descent of the movable die supporting member.

7. An apparatus of the class described comprising a stationary die supporting member, another die supporting member movable toward and from the first named member, a workpiece supporting table on the stationary die supporting member, a tension device carried by the movable die supporting member and movable relatively thereto for engagement with the workpiece prior to the engagement of the dies therewith and for placing the same under increased tension in the descent of the movable die supporting member, male and female dies on said die supporting members and one of which is movable into and out of engagement with the other, and said movable die being adapted to pass through said tension device.

8. An apparatus of the class described comprising a stationary die supporting member, another die supporting member movable toward and from the first named member, a workpiece supporting table on the stationary die supporting member, a tension device carried by the movable die supporting member and movable relatively thereto for engagement with the workpiece prior to the engagement of the dies therewith and for placing the same under increased tension in the descent of the movable die supporting member, male and female dies on said die supporting members and one of which is movable into and out of engagement with the other, said movable die being adapted to pass through said tension device, and means for heating said dies.

9. An apparatus of the class described comprising a stationary die supporting member, another die supporting member movable toward and from the first named member, a workpiece supporting table on the stationary die supporting member, a tension device carried by the movable die supporting member and movable relatively thereto for engagement with the workpiece prior to the engagement of the dies therewith and for placing the same under increased tension in the descent of the movable die supporting member, male and female dies on said die supporting members and one of which is movable into and out of engagement with the other, said movable die being adapted to pass through said tension device, means for heating said dies, and means on the table of the machine for gaging the placement of a workpiece thereon.

10. An apparatus of the class described comprising a stationary die supporting member, another die supporting member movable toward and from the first named member, a workpiece supporting table on the stationary die supporting member, a tension device carried by the movable die supporting member and movable relatively thereto for engagement with the workpiece prior to the engagement of the dies therewith and for placing the same under increased tension in the descent of the movable die supporting member, male and female dies on said die supporting members and one of which is movable into and out of engagement with the other, said movable die being adapted to pass through said tension device, means for heating said dies, means on the table of the machine for gaging the placement of a workpiece thereon, and said last named means being adjustable.

11. An apparatus of the class described comprising male and female dies fashioned to form from a workpiece placed therebetween, a head or facial body having facial contour, said workpiece having facial characteristics or markings thereon adapted to register with predetermined contours of said facial body, means for properly positioning the workpiece in the apparatus to bring the characteristics or markings thereof in proper position between said dies, and means for engaging and holding the workpiece in position prior to the movement of the dies into engagement with the workpiece and with each other.

12. An apparatus of the class described comprising male and female dies fashioned to form from a workpiece placed therebetween, a head or facial body having facial contour, said workpiece having facial characteristics or markings thereon adapted to register with predetermined contours of said facial body, means for properly positioning the workpiece in the apparatus to bring the characteristics or markings thereof in proper position between said dies, means for engaging and holding the workpiece in position prior to the movement of the dies into engagement with the workpiece and with each other, and said last named means including springs for placing the same under tension.

13. An apparatus of the class described comprising male and female dies fashioned to form from a workpiece placed therebetween, a head or facial body having facial contour, said workpiece having facial characteristics or markings thereon adapted to register with predetermined contours of said facial body, means for properly positioning the workpiece in the apparatus to bring the characteristics or markings thereof in proper position between said dies, means for engaging and holding the workpiece in position prior to the movement of the dies into engagement with the workpiece and with each other, said last named means including springs for placing the same under tension, and the tension of said springs being increased as the dies are gradually brought together to increase the pressure on the workpiece in said operation.

14. An apparatus of the class described comprising male and female dies fashioned to form from a workpiece placed therebetween, a head or facial body having facial contour, said workpiece having facial characteristics or markings thereon adapted to register with predetermined contours of said facial body, means for properly positioning the workpiece in the apparatus to bring the characteristics or markings thereof in proper position between said dies, means for engaging and holding the workpiece in position prior to the movement of the dies into engagement with the workpiece and with each other, said last named means including springs for placing the same under tension, the tension of said springs being increased as the dies are gradually brought together to increase the pressure on the workpiece in said operation, and means for heating the dies.

In testimony that we claim the foregoing as our invention we have signed our names this 2nd day of April, 1926.

WILLIAM GLUCKIN.
HARRY GLUCKIN.